Dec. 13, 1927.
F. L. BAMFORD
LIGHT
Filed Aug. 18, 1926
1,652,192
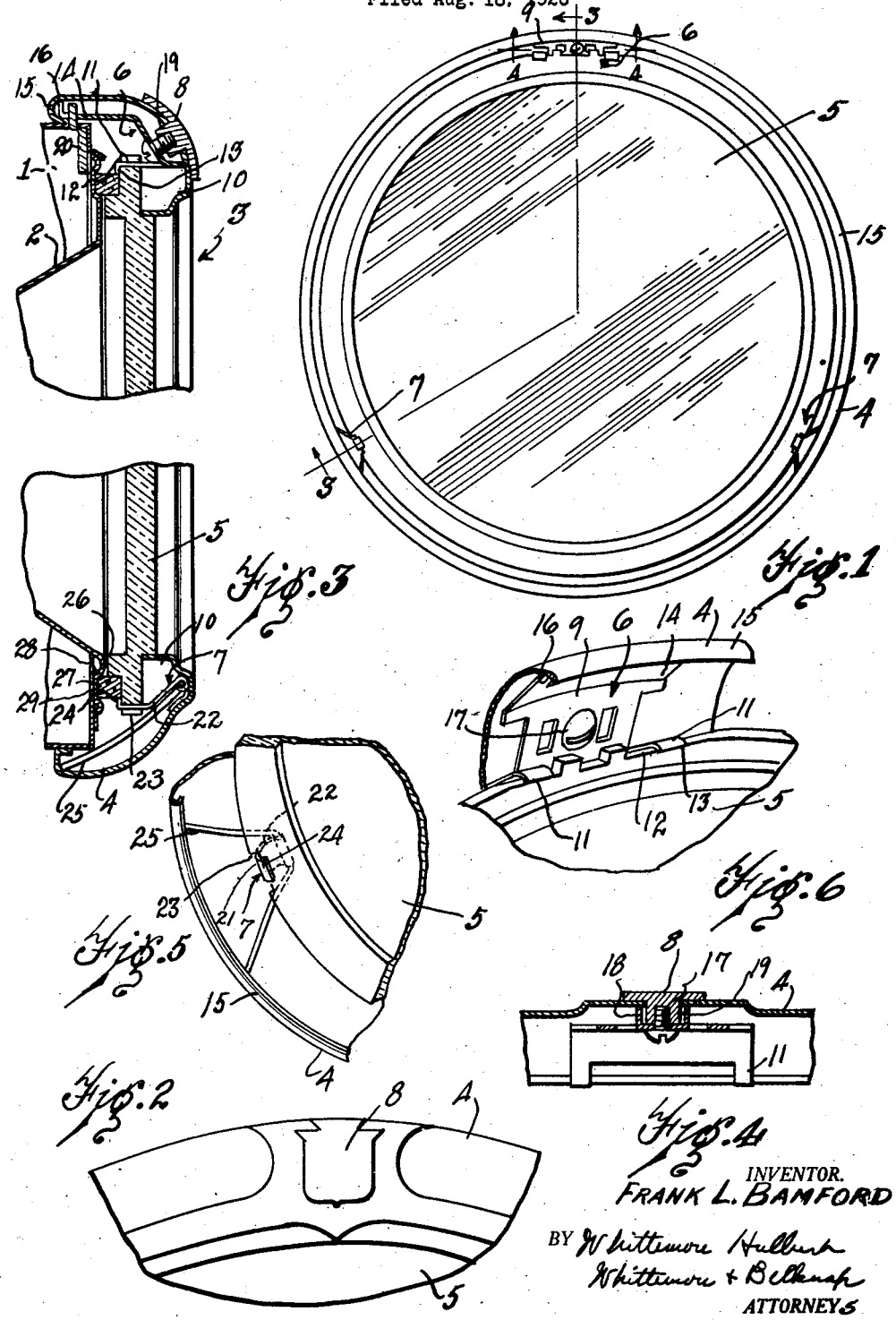
INVENTOR.
FRANK L. BAMFORD
BY Whittemore Hulbert
Whittemore & Belknap
ATTORNEYS Patented Dec. 13, 1927.

1,652,192

UNITED STATES PATENT OFFICE.

FRANK L. BAMFORD, OF DETROIT, MICHIGAN, ASSIGNOR TO C. M. HALL LAMP COMPANY, OF DETROIT, MICHIGAN, A CORPORATION OF MICHIGAN.

LIGHT.

Application filed August 18, 1926. Serial No. 130,038.

The invention relates to lights and refers more particularly to light fronts. One of the objects of the invention is to provide an improved means for retaining the lens in the rim. Another object is to so construct one of the devices of the lens retaining means that it provides means for securing a medallion to the rim and further provides means for cooperating with the body of the light to locate the rim relative to the body. With these as well as other objects in view, the invention resides in the novel features of construction and combinations and arrangements of parts as more fully hereinafter set forth.

In the drawings:—

Figure 1 is an interior side elevation of a light front embodying my invention;

Figure 2 is an exterior side elevation of a portion thereof;

Figures 3 and 4 are cross sections on the lines 3—3 and 4—4 of Figure 1;

Figures 5 and 6 are sectional perspective views of the different lens retaining devices.

The light shown and described in the present instance is a head light designed particularly for use with motor vehicles but it is apparent that the invention is applicable to other lights. The light has the body 1 which is provided with the reflector 2. 3 is the light front including the rim 4 and the lens 5.

For the purpose of retaining the lens in the rim, I have provided a retaining means which is simple in construction, may be cheaply manufactured and readily assembled with the rim and lens. This retaining means, as shown, comprises the device 6 preferably located at the middle of the top of the rim and the pair of devices 7 which are alike and located preferably below the center of the rim and at its sides. The device 6 additionally serves to secure the medallion 8 to the exterior of the rim and to locate the rim upon the light body 1 so that the rim and the lens carried thereby will be correctly positioned for properly directing the light rays.

In detail, the device 6 has the member 9 which is located inside and extends transversely of the rim 4 at the middle of the top. This member is preferably formed of a sheet metal stamping and has its radial inner edge located in the enlarged bead 10 at the inner edge of the rim. 11 are tongues which are sheared from the member and extend from its radial inner edge transversely of the lens 5 through notches 12 in the edge of the lens and terminate in transverse feet or flanges 13 engaging the inner side of the lens. This member 9 has at its radial outer edge the spaced tongues 14 which extend within the bead 15 at the radial outer edge of the rim and terminate in transverse feet or flanges 16 extending radially outward and contacting with the rim. For securing the member 9 to the rim, I have provided the screw 17 which extends through the member, the member being preferably provided with the transversely extending struck out tongues 18 at opposite sides of this screw and engageable with the rim to prevent bending of the member upon tightening the screw. The screw threadedly engages in the boss 19 formed integral with the medallion 8 and extending through the rim so that the screw clamps both the device 6 and medallion 8 to the rim. 20 is a plate rigidly secured to the body 1 and extending upwardly for entering between the tongues 14 of the device 6 and engaging the edge of the bead 15. It will thus be seen that the device 6 further locates the rim and the lens upon the light body.

But one device 7 will be described in detail. This device has the member 21 which is preferably a sheet metal stamping and is located within the enlarged bead 10 of the rim. This member is preferably shaped to conform with a portion of the interior face of the enlarged bead and has the tongue 22 with a portion extending transversely of the lens 5 and through the notch 23 and a terminal foot or flange 24 engaging the inner side of the lens. The device also has the U-shaped resilient wire 25 which extends through the space between the periphery of the lens and the rim and is pivotally connected to the member 21 near the front of the bead 10, the ends of this wire terminating in the bead 15 of the rim and resiliently engaging the rear wall forming the bead to normally hold the member 21 so that it in turn holds the lens against the free edge of the enlarged bead.

From the above description it will be seen that the lens retaining devices 6 and 7 may be readily and cheaply manufactured and that they may also be readily assembled with the lens and rim and will hold the lens against the free edge of the enlarged bead of the rim. Furthermore it will be seen that by spreading the legs of the wires 25 they may be readily disengaged from the bead 15 of the rim after which the lens and these devices may be removed from the rim.

For the purpose of providing a weather tight joint between the lens 5 and the reflector 2 so that no dirt or moisture will be deposited upon the reflector, I have formed the lens with the annular flange 26 upon its inner face and spaced radially inward from its periphery and mount upon the outer periphery of this flange the annular sealing member 27 which may be formed of cork. I also preferably provide the radial flange 28 at the front of the reflector with the annular depression 29 for engagement by the sealing member 27. With this arrangement the annular flange upon the lens positions and secures the sealing member so that it will not become accidentally disengaged or displaced. When the rim is secured in place upon the body the sealing member is compressed and effectively prevents the passage of any dirt or moisture between the lens and the reflector.

What I claim as my invention is:

1. In a light, the combination with a rim and a lens, of means for retaining said lens in said rim including a stamping having a hook engageable with said lens and a yieldable member pivotally connected to said stamping and engageable with said rim to detachably secure said stamping to said rim.

2. In a light, the combination with a rim having a bead at one edge thereof and an enlarged bead at the opposite edge thereof and a lens within said rim and engageable with the edge of the enlarged bead, of means for retaining said lens in said rim including a member engaging the enlarged bead and hooked over said lens and a resilient wire connected to said member at one side of said lens and extending past said lens and detachably engaging the first mentioned bead.

3. In a light, the combination with a rim, a medallion and a lens, of means for retaining said lens in said rim including a device engageable with said lens and a securing element extending through said device into said medallion for clamping said device and said medallion to said rim.

4. In a light, the combination with a rim, a lens, a medallion and a body to which said rim is secured, of means for retaining said lens in said rim including a device engageable with said lens and provided with means for securing said medallion to said rim and for locating said rim relative to said body.

5. In a light, the combination with a rim, a lens, and a medallion, of means for retaining said lens in said rim including a device having a member engageable with the inner side of said rim and a hook-shaped tongue engageable with said lens, and a common means for securing said member and medallion to said rim.

6. In a light, the combination with a rim, a lens and a medallion, of means for retaining said lens in said rim including a device having a member engageable with the inner side of said rim and having at one end a tongue for engaging said lens and at the other end a tongue for positioning said rim upon a light body, and a threaded member for securing said member and medallion to said rim.

In testimony whereof I affix my signature.

FRANK L. BAMFORD.